(12) United States Patent
Malik

(10) Patent No.: US 8,560,702 B2
(45) Date of Patent: Oct. 15, 2013

(54) SAVING AND RETRIEVAL OF BROWSER SESSIONS

(75) Inventor: Dale W. Malik, Dunwoody, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1427 days.

(21) Appl. No.: 11/456,669

(22) Filed: Jul. 11, 2006

(65) Prior Publication Data

US 2008/0016225 A1   Jan. 17, 2008

(51) Int. Cl.
*G06F 15/16* (2006.01)

(52) U.S. Cl.
USPC .......................................... 709/227; 709/249

(58) Field of Classification Search
USPC ........................................................ 709/227
See application file for complete search history.

(56) References Cited

U.S. PATENT DOCUMENTS

| | | | |
|---|---|---|---|
| 6,216,151 B1 * | 4/2001 | Antoun ......................... | 709/203 |
| 6,704,031 B1 * | 3/2004 | Kimball et al. ............... | 715/745 |
| 7,117,504 B2 * | 10/2006 | Smith et al. ................... | 719/328 |
| 7,181,438 B1 * | 2/2007 | Szabo .............................. | 707/2 |
| 7,318,066 B2 * | 1/2008 | Kaufman et al. ............. | 707/102 |
| 2003/0195963 A1 * | 10/2003 | Song et al. .................... | 709/227 |
| 2004/0153456 A1 * | 8/2004 | Charnock et al. ............. | 707/10 |
| 2005/0086211 A1 * | 4/2005 | Mayer .............................. | 707/3 |
| 2005/0160167 A1 * | 7/2005 | Cheng et al. .................. | 709/224 |
| 2005/0203882 A1 * | 9/2005 | Godley ............................ | 707/3 |
| 2006/0026079 A1 * | 2/2006 | Fox .................................. | 705/26 |
| 2006/0221190 A1 * | 10/2006 | Limberis et al. ............ | 348/207.1 |
| 2007/0100967 A1 * | 5/2007 | Smith et al. ................... | 709/219 |
| 2008/0016225 A1 * | 1/2008 | Malik .......................... | 709/227 |
| 2008/0091745 A1 * | 4/2008 | Malik .......................... | 707/204 |

OTHER PUBLICATIONS

Google Launches Personalized Home Page By Danny Sullivan, Search Engine Watch, May 20, 2005.*

* cited by examiner

*Primary Examiner* — William Goodchild
(74) *Attorney, Agent, or Firm* — Scott P. Zimmerman, PLLC

(57) ABSTRACT

Included are systems and methods for resuming a previous browsing session. At least one embodiment of a method includes receiving a request to initiate a current browsing session and in response to receiving a request to initiate a current browsing session, retrieving data related to a previous browsing session, the previous browsing session being different than the current browsing session. Other embodiments include providing the retrieved data in the current browsing session such that the current browsing session is presented as a continuation of the previous browsing session.

20 Claims, 20 Drawing Sheets

FIG. 7

SAVING AND RETRIEVAL OF BROWSER SESSIONS

BACKGROUND

As Internet use has increased, users have demanded increased functionality from the web browsers they use. More specifically, "back" buttons, "forward" buttons, "print" buttons, etc. have been included with the web browser to provide users with faster access to various features of the browser. Additionally, many browsers may be configured to provide links to previously viewed web pages in a "history" option. While these features can provide increased web browsing efficiency, web browsers are generally not configured to allow a user to resume a previous web browsing session after the web browser has been closed. Additionally, current browsers are generally not configured to differentiate between different users of a computing device.

Thus, a heretofore unaddressed need exists in the industry to address the aforementioned deficiencies and inadequacies.

SUMMARY

Included are systems and methods for resuming a previous browsing session. At least one embodiment of a method includes receiving a request to initiate a current browsing session and in response to receiving a request to initiate a current browsing session, retrieving data related to a previous browsing session, the previous browsing session being different than the current browsing session. Other embodiments include providing the retrieved data in the current browsing session such that the current browsing session is presented as a continuation of the previous browsing session.

Also included are embodiments of a computer readable medium for resuming a previous browsing session. At least one embodiment of a computer readable medium includes logic configured to receive a request to initiate a current browsing session and logic configured to, in response to receiving a request to initiate a current browsing session, retrieve data related to a previous browsing session, the previous browsing session being different than the current browsing session. Other embodiments include logic configured to provide the retrieved data in the current browsing session such that the current browsing session is presented as a continuation of the previous browsing session.

Also included are embodiments of a computing device configured for resuming a previous browsing session. At least one embodiment of a computing device includes a processor configured to execute at least one piece of logic and a storage device configured to store a web browser. The web browser including logic configured receive a request to initiate a current browsing session and logic configured to, in response to receiving a request to initiate a current browsing session, retrieve data related to a previous browsing session, the previous browsing session being different than the current browsing session. In other embodiments the web browser includes logic configured to provide the retrieved data in the current browsing session such that the current browsing session is presented as a continuation of the previous browsing session.

Other systems, methods, features, and advantages of this disclosure will be or become apparent to one with skill in the art upon examination of the following drawings and detailed description. It is intended that all such additional systems, methods, features, and advantages be included within this description and be within the scope of the present disclosure.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

FIG. 7 is an exemplary web browser display of a web page that may be accessed by selecting a link from the web browser display of FIG. 6.

DETAILED DESCRIPTION

Figure 1:
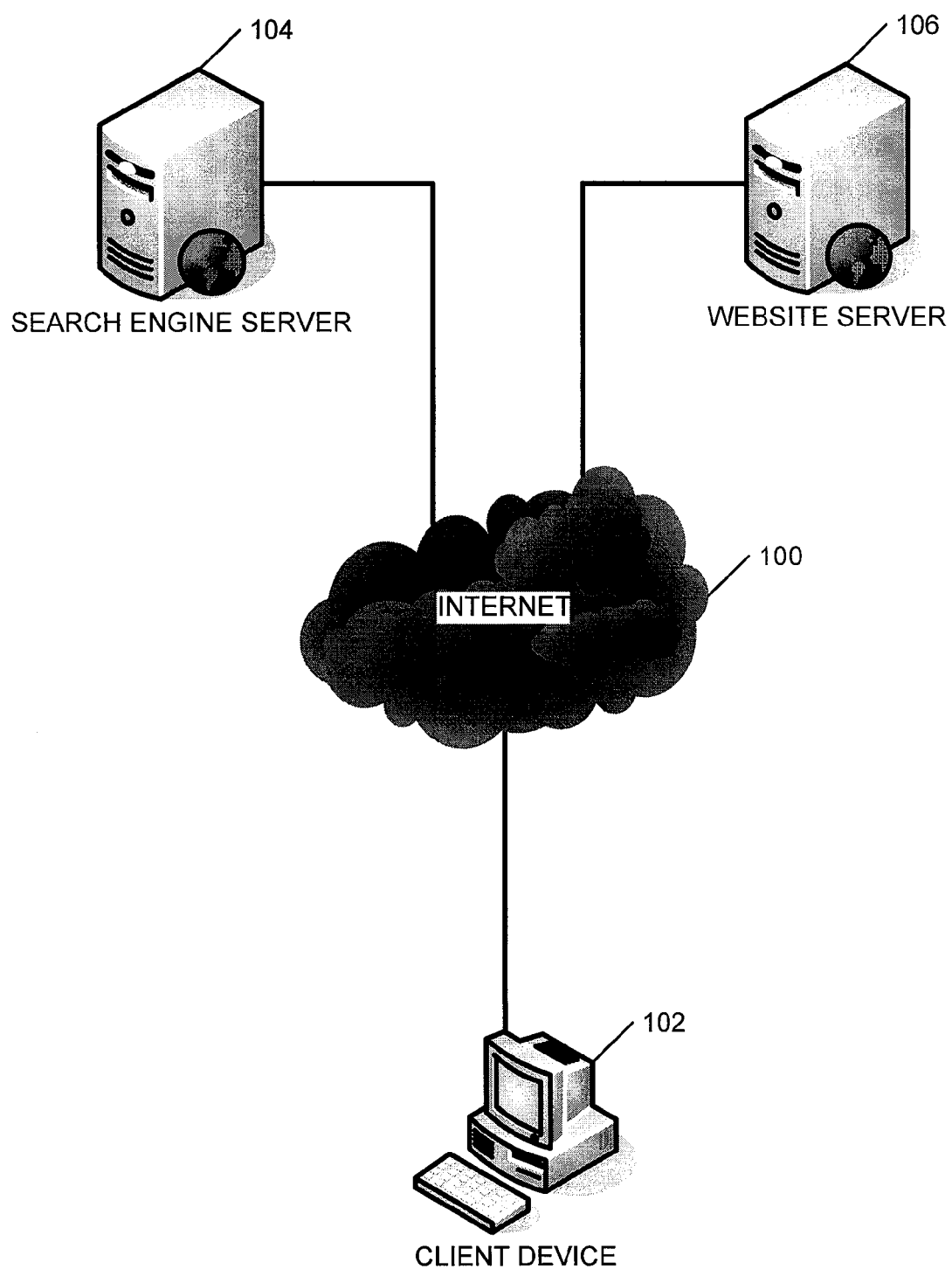
FIG. 1 is a network diagram illustrating exemplary components that may be implemented to provide a user with website data.

FIG. 1 is a network diagram illustrating exemplary components that may be implemented to provide a user with website data. More specifically, the configuration from FIG. 1 illustrates a client device 102 coupled to a network, such at the Internet 100. The Internet 100 may also be coupled to a search engine server 104, as well as a website server 106. In operation, the client device 102 can access the Internet 100, which can act as a portal for data provided by search engine server 104. The search engine server 104 can provide data related to a web page that allows the user of client device 102 to enter search criteria related to desired subject matter. The search engine 104 server can then search other web pages associated with the Internet 100 according to the received search criteria. Upon completing the search, the search engine server 104 can provide data (which may take the form of source code) that includes an address associated with at least one of the web pages revealed in the search. Upon receiving the data, a web browser (and/or other logic) associated with the client device 102 can determine a format for displaying the received information. The user can then select at least one of the addresses. Upon receiving the user selection, the search engine server 104 can redirect the client device 102 to the website server 106 associated with the selected address.

One should note that although a single server is illustrated for representing search engine server 104, as one of ordinary skill on the art will understand, one or more servers, computers, etc. may be utilized to provide the desired functionality. Similarly, while the components of FIG. 1 are illustrated as having a wired connection to Internet 100, this is also a nonlimiting example. In at least one embodiment one or more components may be wirelessly coupled to Internet 100.

Figure 2:
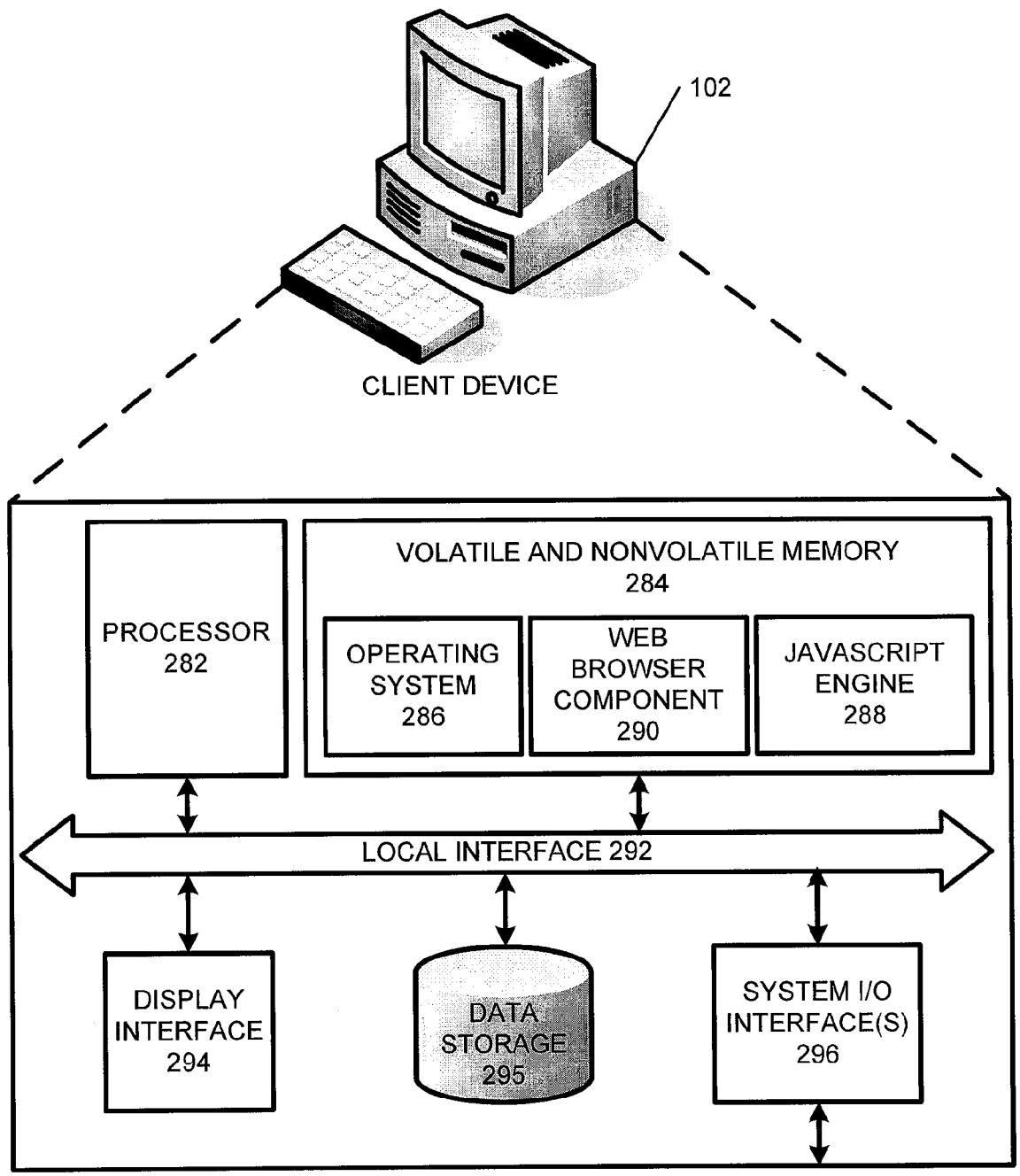
FIG. 2 is a block diagram illustrating exemplary components that may be associated with a client device, such as the client device from FIG. 1.

FIG. 2 is a block diagram illustrating exemplary components that may be associated with a client device, such as the client device from FIG. 1. Although the client device of FIG. 2 is illustrated as a personal computer, this discussion can be applied to any device that can be configured for providing the desired functionality. Examples include, but are not limited to a desktop computer, laptop computer, mobile telephone, Blackberry®, PDA, Ipod®, Treo®, etc. Generally, in terms of hardware architecture, as shown in FIG. 2, the client device 102 includes a processor 282, volatile and nonvolatile memory 284, a display interface 294, data storage 295, and one or more input and/or output (I/O) device interface(s) 296 that are communicatively coupled via a local interface 292. The local interface 292 can include one or more buses and/or other wired or wireless connections. The local interface 292 may have additional elements, which are omitted for simplicity, such as controllers, buffers (caches), drivers, repeaters, and receivers to enable communications. Further, the local interface may include address, control, and/or data connections to enable appropriate communications among the aforementioned components. The processor 282 may be a hardware device for executing software, particularly software stored in volatile and nonvolatile memory 284.

The processor 282 can be any custom made or commercially available processor, a central processing unit (CPU), an auxiliary processor among several processors associated with the client device 102, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard® Company, an 80×86 or Pentium® series microprocessor from Intel® Corporation, a PowerPC® microprocessor from IBM®, a Sparc® microprocessor from Sun Microsystems®, Inc, or a 68xxx series microprocessor from Motorola® Corporation.

The volatile and nonvolatile memory 284 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 284 may incorporate electronic, magnetic, optical, and/or other types of storage media. Note that the volatile and nonvolatile memory 284 can have a distributed architecture, where various components are situated remote from one another, but can be accessed by the processor 282. Additionally, volatile and nonvolatile memory 284 can include an operating system 286, a web browser component 290, and a JavaScript engine 288. As one of ordinary skill in the art will understand, while the operating system 286, web browser component 290, and JavaScript engine 288 are illustrated as separate software components within the same memory unit 284, this is a nonlimiting example. More specifically, depending on the particular configuration, these software components may be combined either in whole or in part. Similarly, while client device 102 is illustrated as including an operating system 286 a web browser component 290, and a JavaScript engine 288, one should note that, depending on the particular configuration, client device 102 may include only a portion of these components and/or functionality. Additionally, while these components are illustrated as software modules, as one of ordinary skill in the art will understand, this logic can be represented in one or more components of software, hardware, firmware, etc.

Additionally, the operating system 286 in volatile and nonvolatile memory 284 may include one or more separate programs, each of which includes an ordered listing of executable instructions for implementing logical functions. A nonexhaustive list of examples of suitable commercially available operating systems is as follows: (a) a Windows® operating system available from Microsoft® Corporation; (b) a Netware® operating system available from Novell®, Inc.; (c) a Macintosh® operating system available from Apple® Computer, Inc.; (d) a UNIX operating system, which is available for purchase from many vendors, such as the Hewlett-Packard® Company, Sun Microsystems®, Inc., and AT&T® Corporation; (e) a LINUX operating system, which is freeware that is readily available on the Internet 100; (f) a run time Vxworks® operating system from WindRiver® Systems, Inc.; and/or (g) an appliance-based operating system, such as that implemented in handheld computers or personal data assistants (PDAs) (e.g., PalmOS® available from Palm®

Computing, Inc., and Windows CE® available from Microsoft® Corporation). The operating system 286 can be configured to control the execution of other computer programs and provides scheduling, input-output control, file and data management, memory management, and communication control and related services.

A system component embodied as software may also be construed as a source program, executable program (object code), script, and/or any other entity comprising a set of instructions to be performed. When constructed as a source program, the program is translated via a compiler, assembler, interpreter, or the like, which may or may not be included within the volatile and nonvolatile memory 284, so as to operate properly in connection with the operating system 286.

The input/output devices that may be coupled to system I/O interface(s) 296 may include input devices, for example but not limited to, a keyboard, mouse, scanner, microphone, etc. Further, the input/output devices may also include output devices, for example but not limited to, a printer, display, speaker, etc. Finally, the input/output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

If the client device 102 is a personal computer, workstation, or the like, the software in the volatile and nonvolatile memory 284 may further include a basic input output system (BIOS) (omitted for simplicity). The BIOS is a set of software routines that initialize and test hardware at startup, start the operating system 286, and support the transfer of data among the hardware devices. The BIOS is stored in ROM so that the BIOS can be executed when the client device 102 is activated. When the client device 102 is in operation, the processor 282 may be configured to execute software stored within the volatile and nonvolatile memory 284, to communicate data to and from the volatile and nonvolatile memory 284, and to generally control operations of the client device 102 pursuant to the software. Software in memory, in whole or in part, are read by the processor 282, perhaps buffered within the processor 282, and then executed.

Figure 3:
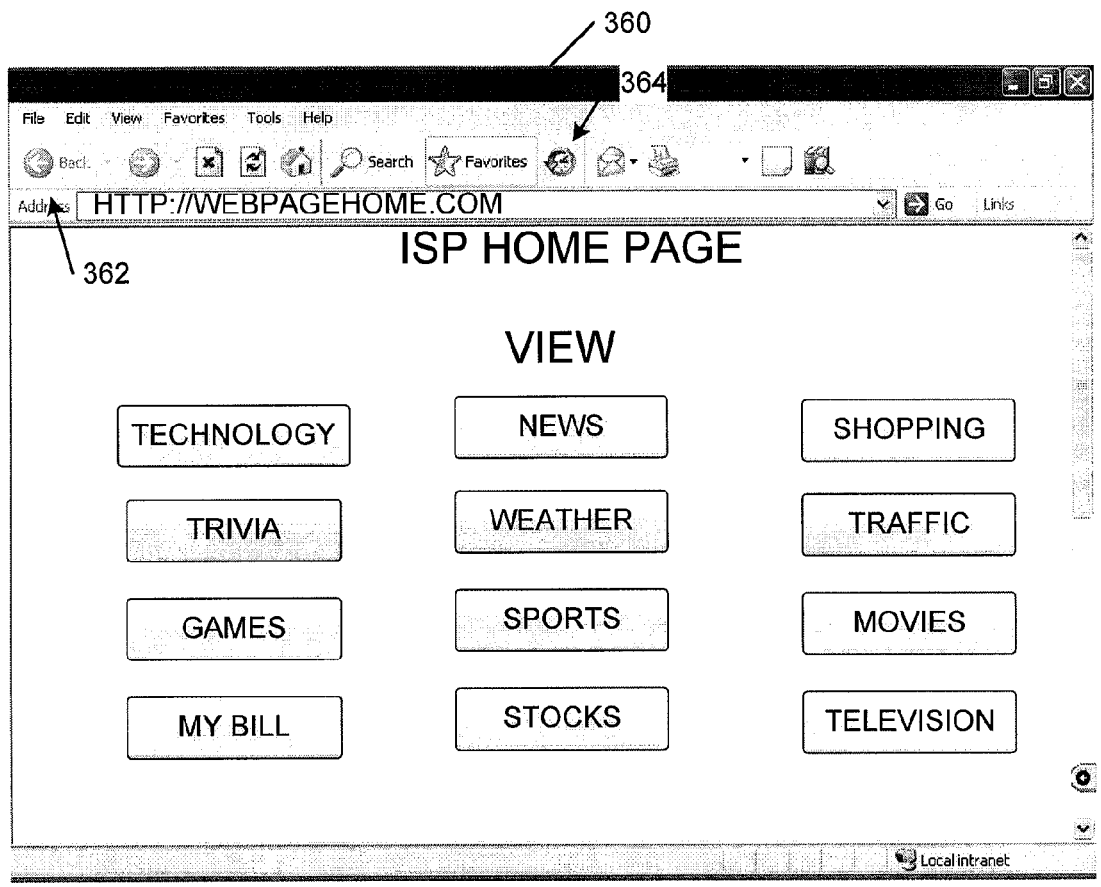
FIG. 3 is an exemplary web browser display of a web page that may be provided to a user by the computing device from FIG. 2, upon initiating a web browsing session.

FIG. 3 is an exemplary web browser display of a web page that may be provided to a user by the computing device from FIG. 2, upon initiating a web browsing session. As illustrated, web browser display 360 is configured to default to a "home page" when first opened. A home page is a website (and/or other display) that the web browser can automatically access when opened. As shown in FIG. 3, the web browser display 360 is configured to open "ISP Home Page." The web browser may also include a "back" button 362. The back button 362 can be configured to allow the user to view one or more web pages (and/or other display) that was most recently displayed in the current web browsing session. As the web browser display 360 has only opened the home page in this particular web browsing session, however, the back button 362 is inactive.

Additionally included in web browser display 360 is a "history" button 364. The history button can be configured to provide the user with information related to web pages visited by the web browser display 360 over a predetermined amount of time. More specifically, upon selecting history button 364, the user can view links to web pages that have been viewed today, yesterday, a week ago, etc. Additionally, the links can be organized chronology or alphabetically.

Figure 4:
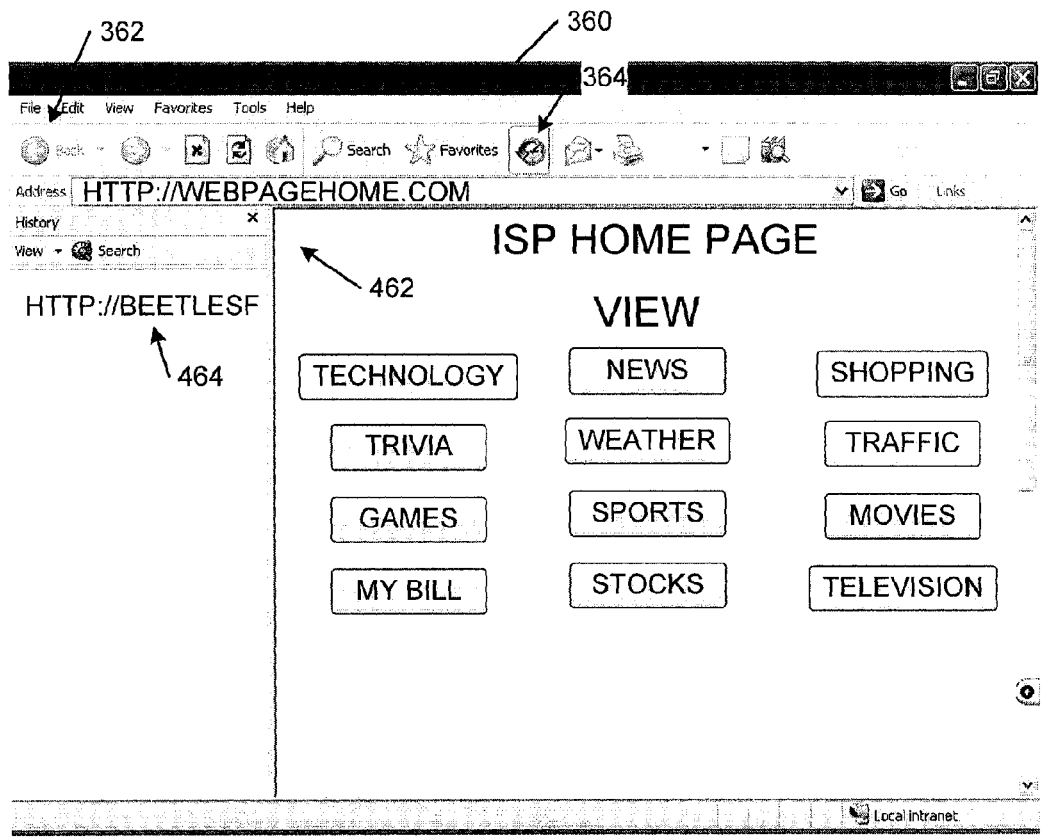
FIG. 4 is an exemplary web browser display of a web page, illustrating utilization of a history function, similar to the web browser display from FIG. 3.

FIG. 4 is an exemplary web browser display of a web page, illustrating utilization of a history function, similar to the web browser display from FIG. 3. As illustrated, by selecting the history button 364 in web browser display 360, a history section 462 can be displayed. The history section 462 can display a listing of one or more websites that have been visited by the web browser. By selecting the website link 464, the web browser display 360 can contact the selected website, to receive a current version of the requested page.

Figure 5:
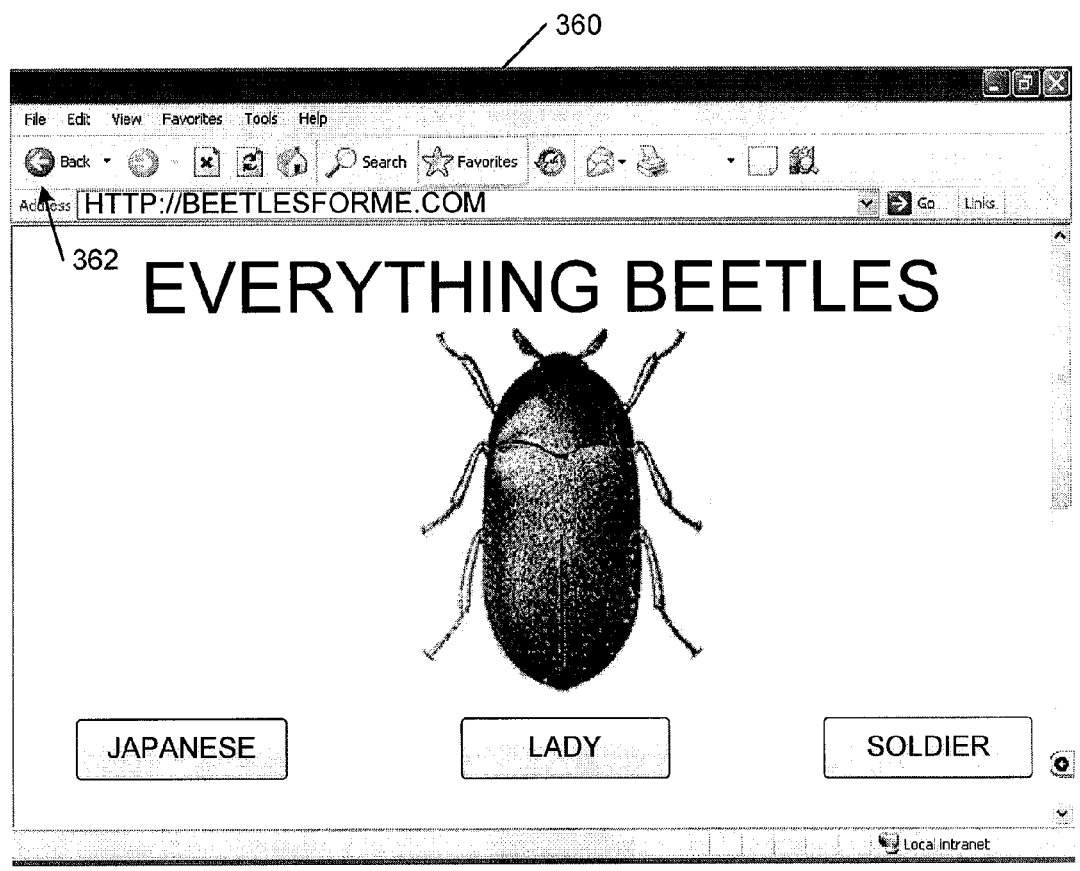
FIG. 5 is an exemplary web browser display of a web page that may be accessed in the web browsing session from FIG. 4.

FIG. 5 is an exemplary web browser display of a web page that may be accessed in the web browsing session from FIG. 4. More specifically, upon selecting website link 464, the web browser can access the web page beetlesforme.com, as illustrated in web browser display 360. Additionally, the user can access this web page by manually entering the Uniform Resource Locator (URL), and or via other means. As illustrated, upon accessing beetlesforme.com, the web browser display 360 activates back button 362. Back button 362 can allow the user to access a page previously viewed in the current web browsing session. Generally speaking, upon displaying a web page, the web browser display 360 can store at least a portion of the web page, such that when the user selects back button 362, the web browser displays a stored version of the web page, instead of performing an additional search for the requested page.

Figure 6:
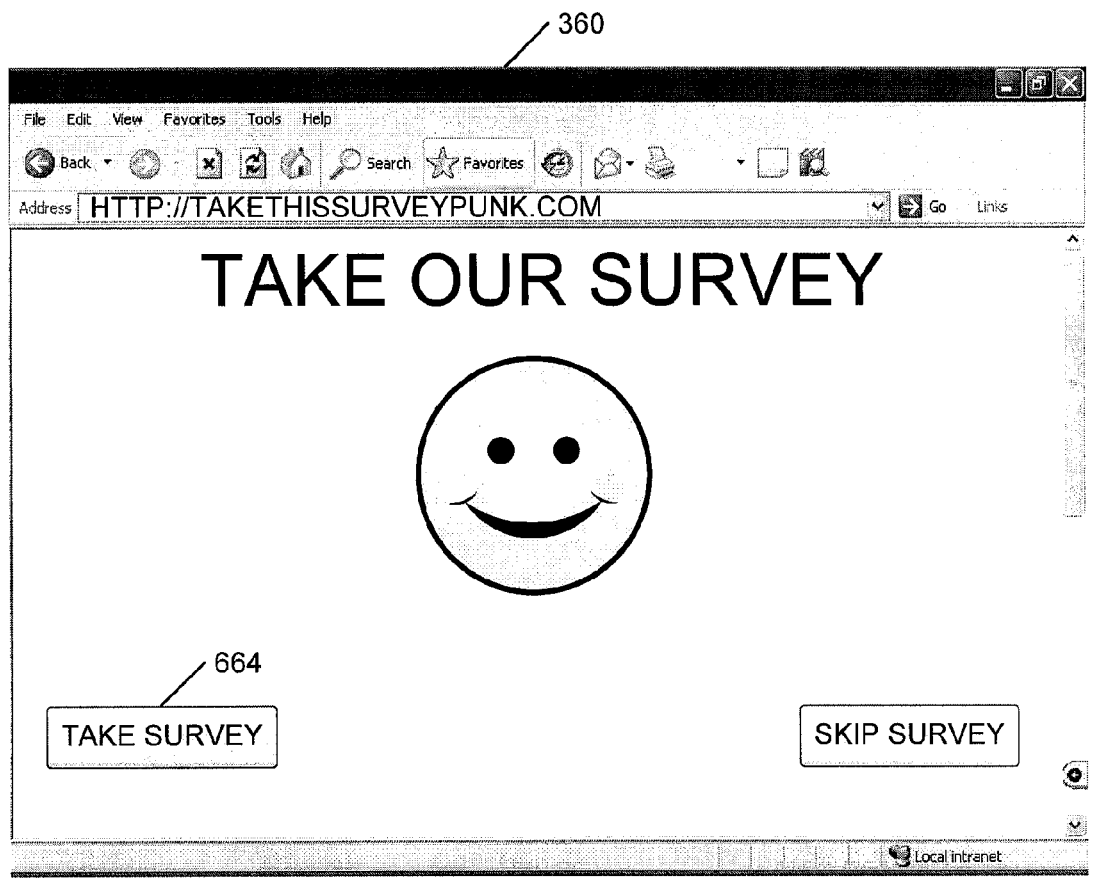
FIG. 6 is an additional exemplary web browser display of a web page that may be accessed in the same web browser session as FIG. 3.

FIG. 6 is an additional exemplary web browser display of a web page that may be accessed in the same web browser session as FIG. 3. As discussed with respect to FIG. 5, the user can access this web page in any of a plurality of ways including manually inputting a URL, selecting the web page from a history section 462, selecting the web page from a "favorites" option (not shown) and/or via other actions. Additionally, by selecting "take survey" option 664, the user can proceed to the web page illustrated in FIG. 7.

Figure 7:
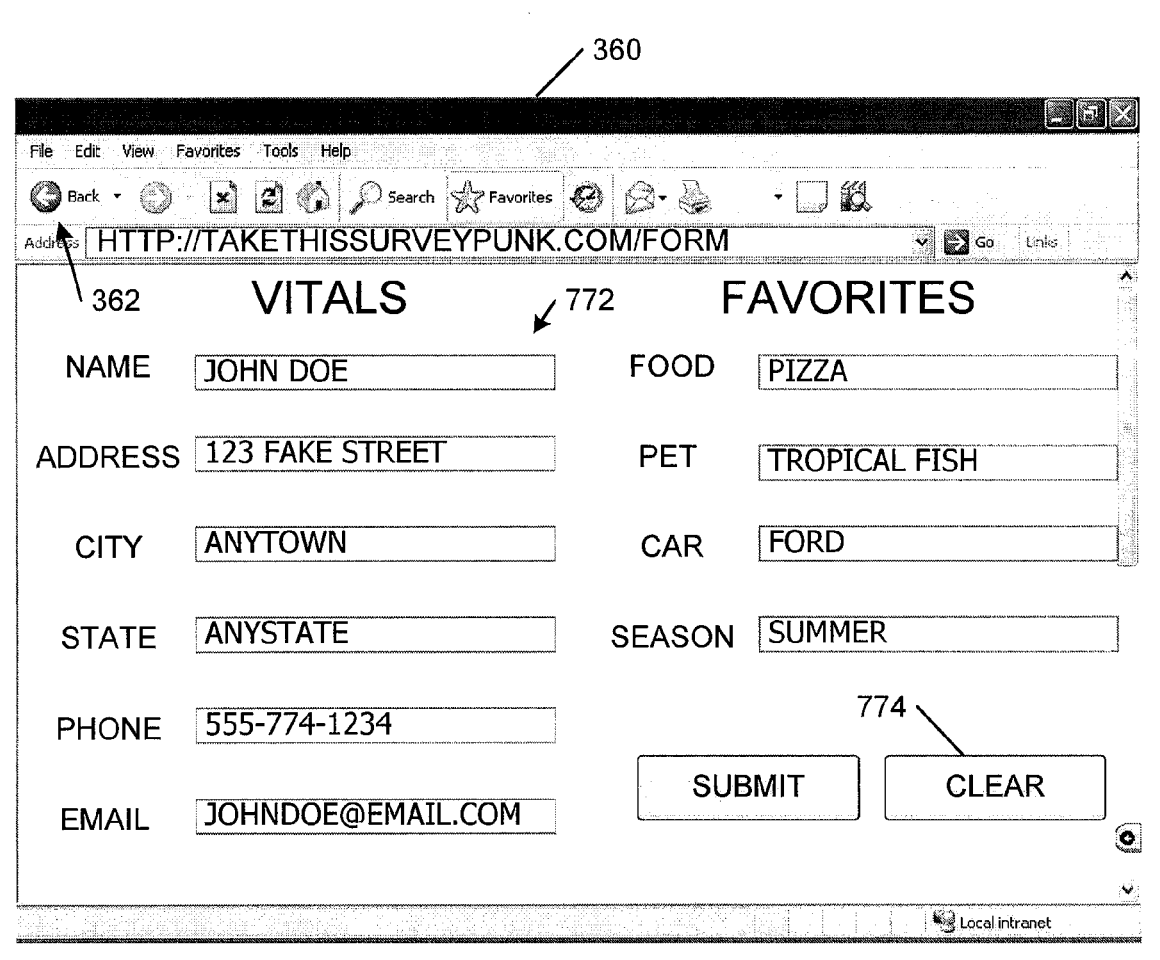

FIG. 7 is an exemplary web browser display of a web page that may be accessed by selecting a link from the web browser display of FIG. 6. By selecting option 664, the user can be provided with the web page associated with the URL takethissurveypunk.com/form. More specifically, in this nonlimiting example, the user is provided with a form for inputting data. As illustrated in FIG. 7, the user has input personal information 772 into the defined fields. However, after the user inputs the desired data into the defined fields, the user may accidentally close web browser display 360, may accidentally select clear option 774 or otherwise lose the input data and/or end the current web browsing session. In such a scenario, web browser display 360 may be generally unable to recover the lost data.

One should note that although the history button 364 may provide the ability to view web pages viewed in a previous web browsing session, the user generally does not have the ability to continue a previous web browsing session. Additionally, the upon opening a new web browsing session, as in FIG. 4, the web browser display 360 does not generally activate the back button 362. The user, thus, may not have access to the back button until accessing a plurality of web pages in the current browsing session, as illustrated in FIGS. 5, 6, and 7.

Figure 8:
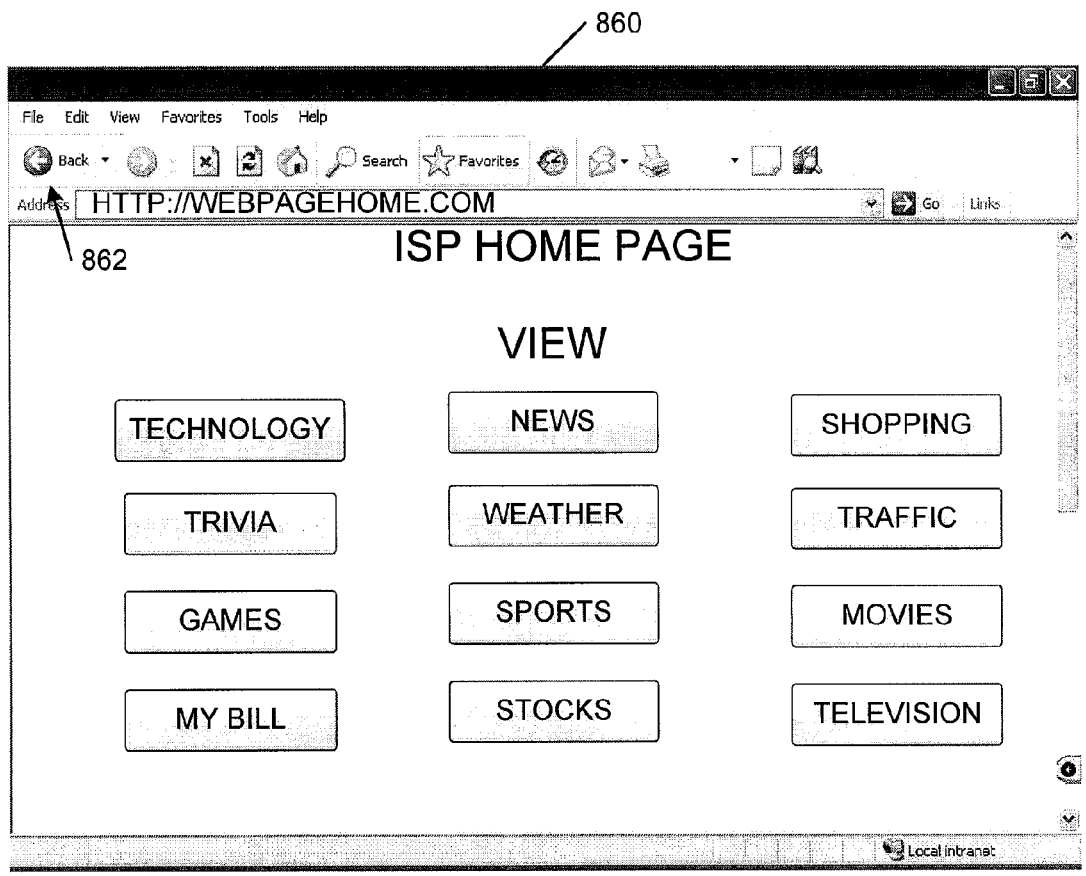
FIG. 8 is an exemplary web browser display of a web page with the ability to incorporate a previous web browsing session, similar to the web browser display from FIG. 3.

FIG. 8 is an exemplary web browser display of a web page with the ability to incorporate a previous web browsing session, similar to the web browser display from FIG. 3. Similar to the configuration from FIG. 3, the web browser display 860 has opened a new web browsing session. The web browser display 860 defaults to a home page, similar to the web browser display 360. However, in this nonlimiting example, the web browser display 860 is configured to continue a previous web browsing session via back button 862. More specifically, in at least one embodiment, if the user desires to view the most recently viewed web page from the last web browsing session, the user can select the back button 862. The web browser can then facilitate display of the requested page.

One should note that, depending on the particular configuration, upon selecting the back button 862, the web browser can retrieve stored data related to web pages from a previous web browsing session, however this is not a requirement. In at least one embodiment, upon the user selecting the back button 862, the web browser can send a new request for the web page to facilitate display of the most current data.

Figure 9:
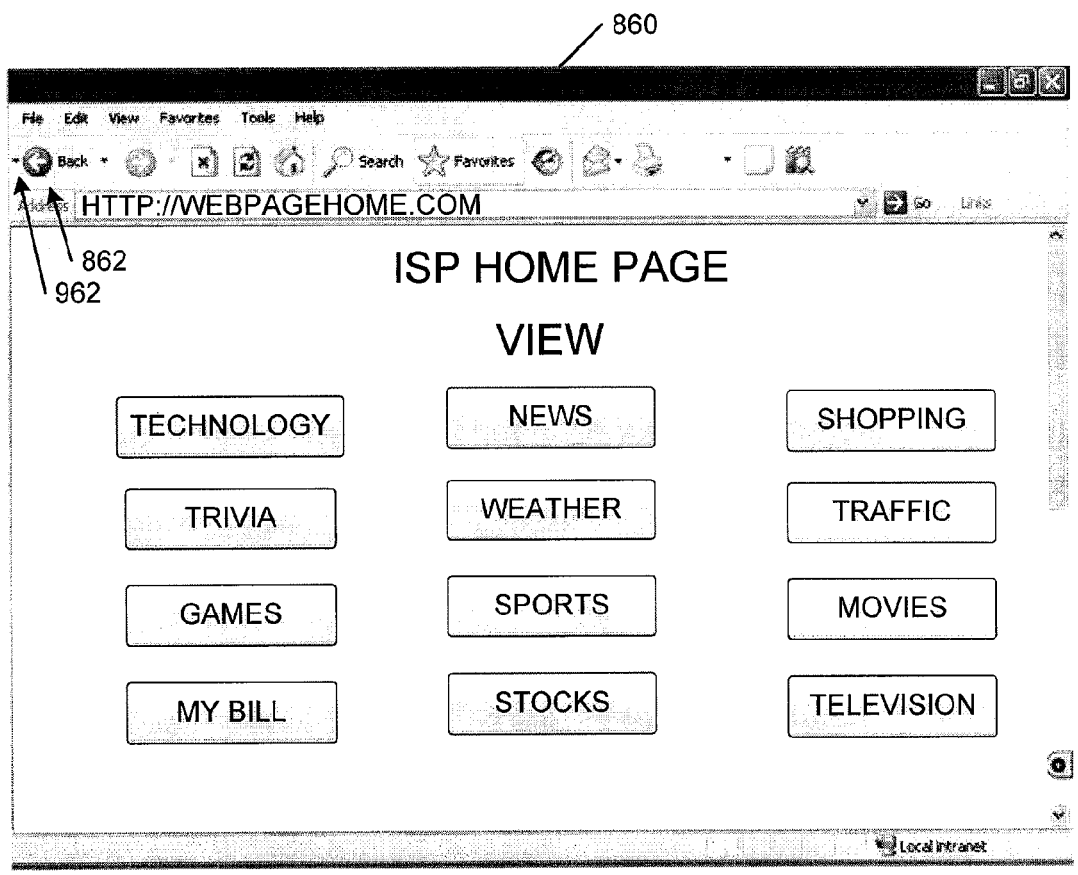
FIG. 9 is an exemplary web browser display of a web page that may be configured to display any number of web pages from a previous web browsing session, similar to the web browser display from FIG. 8.

FIG. 9 is an exemplary web browser display of a web page that may be configured to display any number of web pages from a previous web browsing session, similar to the web browser display from FIG. 8. In this nonlimiting example, in addition to back button 862, web browser display 860 can also include a "visual back button" 962. While the back button 862 can provide automatic access to the most recently viewed web page (and from there the next most recently viewed web page, etc.), the visual back button 962 can provide a pictorial representation of at least a portion of web pages from a previous (and/or current) web browsing session.

One should note that while, the visual back button 962 is illustrated as being part of back button 862, this is a nonlimiting example, as visual back button 962 can be configured as any option for accessing the desired data. Additionally, while back button 862 is described above as directly accessing the most recently viewed web page, in at least one configuration, the back button (and/or other options) can provide the ability to view a plurality of previously viewed web pages as a textual list.

Figure 10:
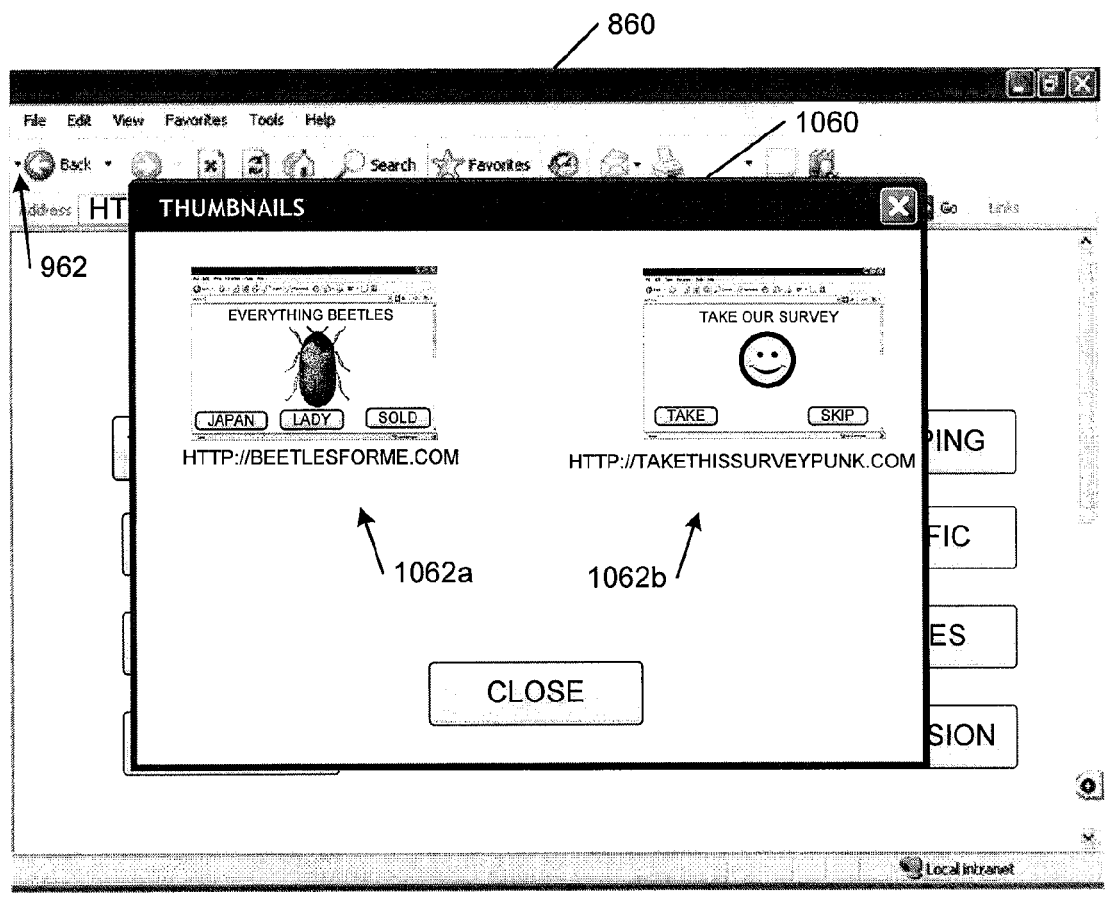
FIG. 10 is an exemplary web browser display, illustrating a thumbnail representation of a plurality of web pages from a previous web browsing session, similar to the web browser display from FIG. 9.

FIG. 10 is an exemplary web browser display, illustrating a thumbnail representation of a plurality of web pages from a previous web browsing session, similar to the web browser display from FIG. 9. More specifically, as the user is browsing various web pages, the web browser display 860 can take a "snapshot" of one or more of the displayed web pages. The snapshot can include a screenshot of the web page, may include text recognition, and may be configured to capture both data provided by the web page, as well as data input by the user.

Referring again to FIG. 10, in selecting visual back button 962, the user is provided with thumbnails window 1060. Thus thumbnails window 1060 can be configured to provide a visual (e.g., thumbnail) display of the one or more of the web pages viewed in this and/or a previous web browsing session (e.g., thumbnails 1062a and 1062b). The thumbnails can be interactive, such that, upon selecting one or more of the thumbnails, the web browser opens the selected web page. As discussed above, depending on the particular configuration, the web browser can access a stored version of the web page and/or send a web page request for a current version of the web page.

Figure 11:
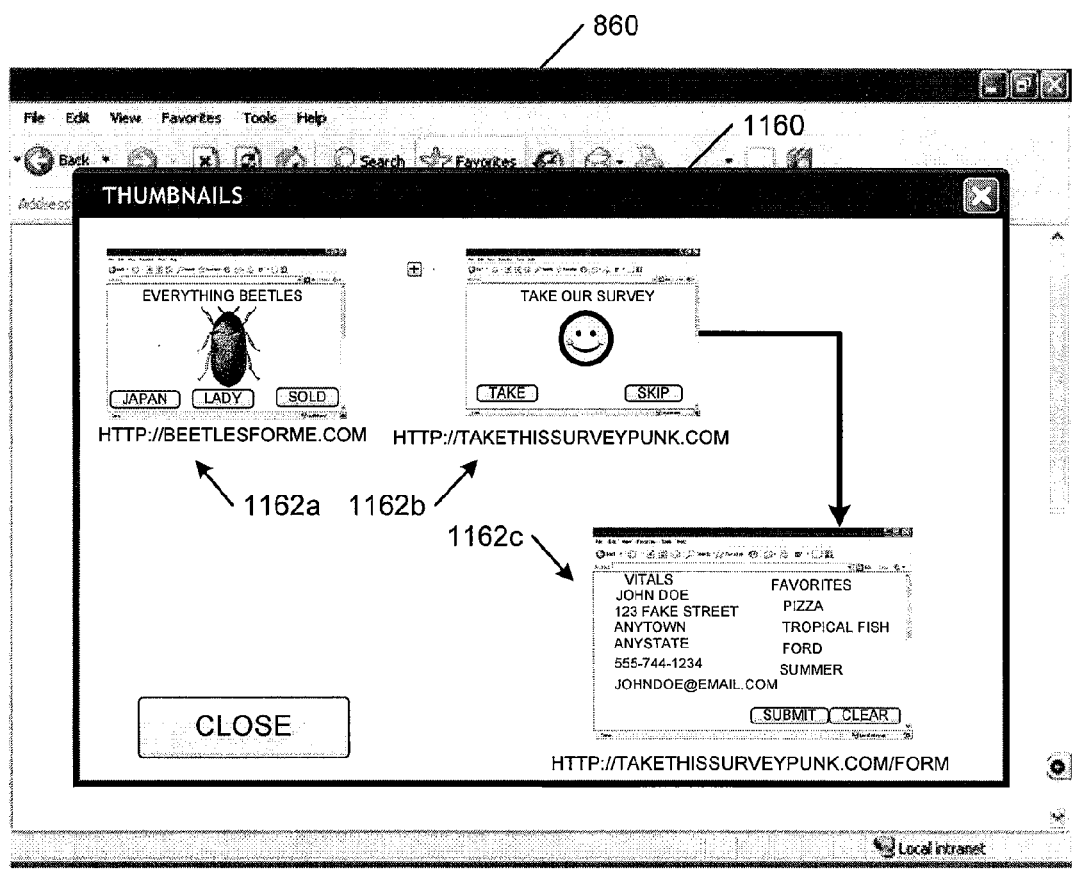
FIG. 11 is an exemplary web browser display, illustrating a hierarchical thumbnail representation of a plurality of web pages from a previous web browsing session, similar to the web browser display from FIG. 10.

FIG. 11 is an exemplary web browser display, illustrating a hierarchical thumbnail representation of a plurality of web pages from a previous web browsing session, similar to the web browser display from FIG. 10. Similar to the configuration from FIG. 10, web browser display 860 can be configured to provide a thumbnails window, however in this configuration, an expandable/contractible hierarchy of the web pages is also displayed. More specifically, in at least one configuration, the thumbnails window 1160 can be configured to display a relationship of the stored web pages. In this nonlimiting example, the user accessed the takethissurveypunk.com (FIG. 6) and then accessed the takethissurveypunk.com/forms (FIG. 7) web page. As the latter web page is related to the former, this relationship is displayed with the arrow connecting thumbnail 1162b and 1162c. Since thumbnail 1162a is not related to thumbnails 1162b and 1162c, no such relationship is displayed.

One should note that although a relationship display is provided in FIG. 11, this is a nonlimiting example, as other configurations can provide a graphical representation of the user's path to reach each web page. More specifically, as the user viewed beetlesforme.com, followed by takethissurveypunk.com, followed by takethissurveypunk.com/forms, this path can be depicted. Additionally, if the user input data, downloaded files, etc., this information can be conveyed as well. Other information, such as time first accessed, time spent, number of actions taken, description of actions taken, etc. can also be displayed. Additionally, as discussed above, this information can relate to the current web browsing session and/or previous web browsing session(s).

Figure 12:
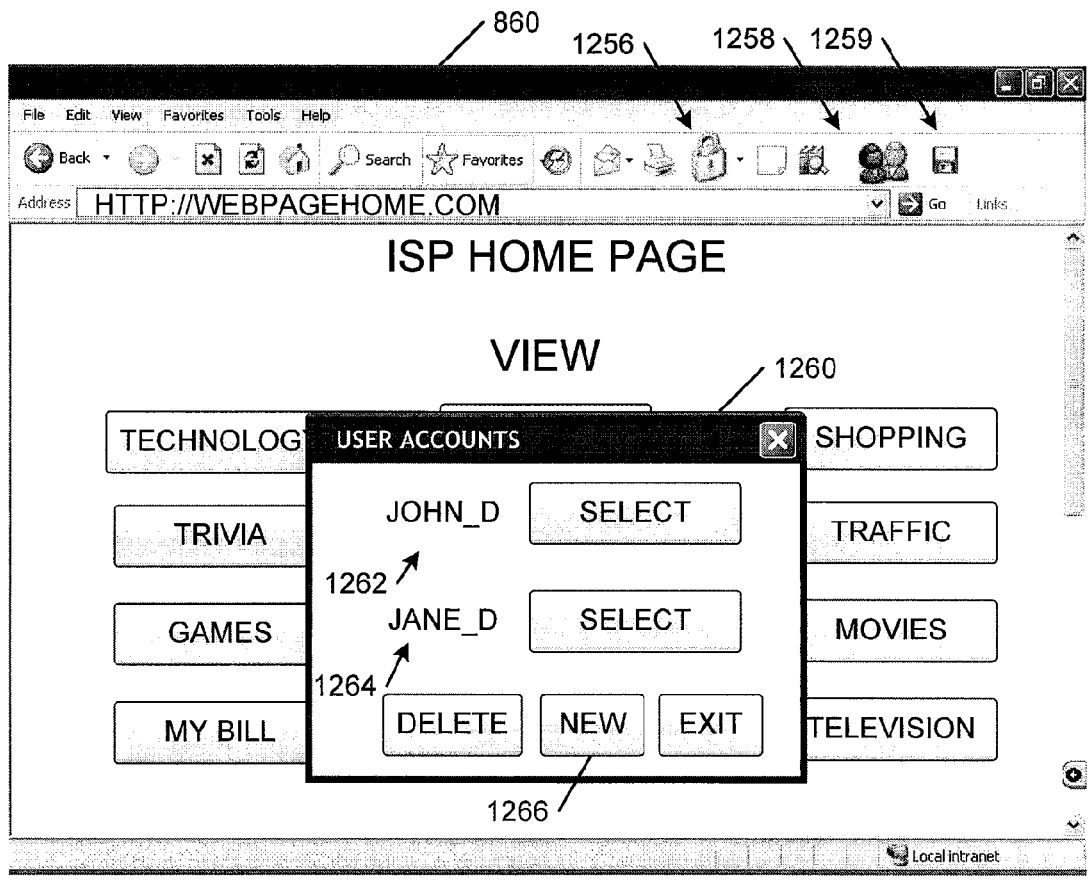
FIG. 12 is an exemplary web browser display, illustrating the ability to view one or more user accounts associated with the web browser from FIG. 8.

FIG. 12 is an exemplary web browser display, illustrating the ability to view one or more user accounts associated with the web browser from FIG. 8. As illustrated, web browser display 860 can include a plurality of toolbar options including an authentication option 1256, a user accounts option 1258, and a save web session 1259. In response to a selection of user accounts option 1258, a user accounts window 1260 may be displayed that allows the user to select one or more user accounts, such as user account 1262 and user account 1264. Additionally, the web browser display 860 can be configured to delete user accounts, add user accounts, and/or exit.

In at least one configuration, the web browser display 860 may authenticate a user attempting to access and/or delete one or more of the accounts (described in more detail below). Additionally, other embodiments may, upon selection of "new" option 1266, prompt the user for creation of a USERID and password for future authentication.

Figure 13:
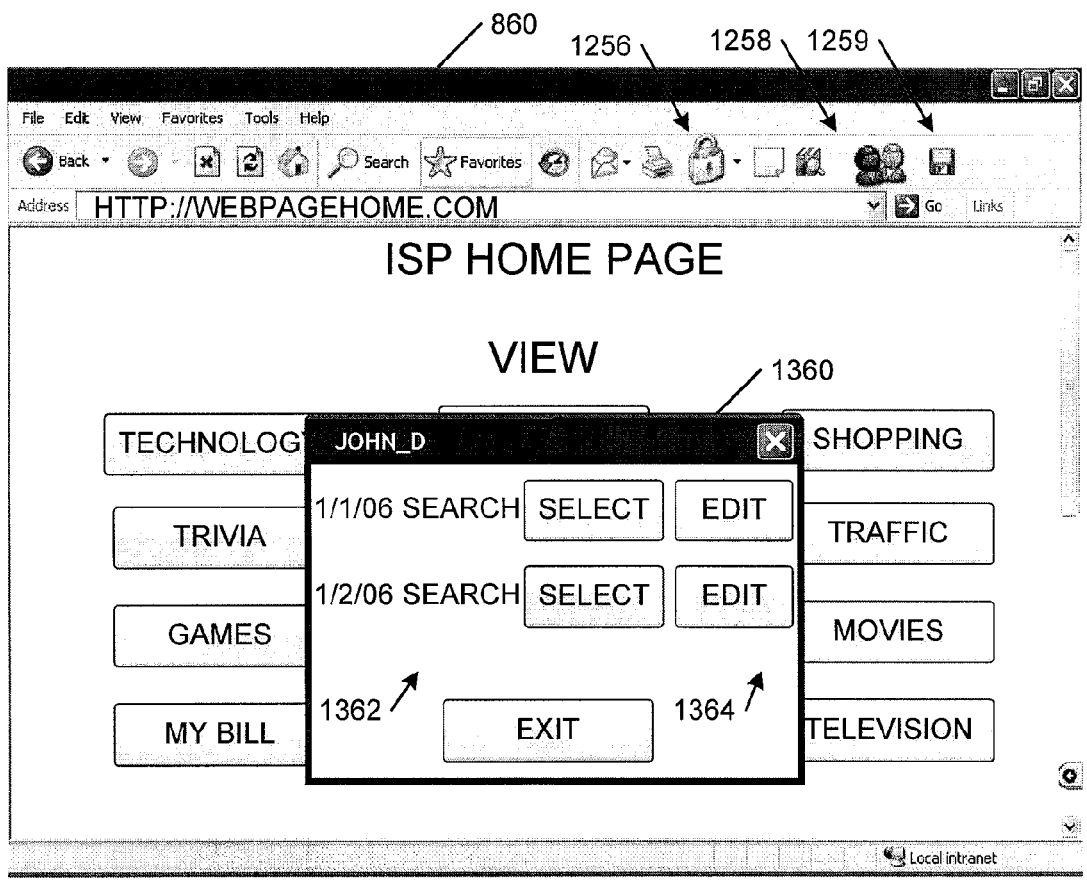
FIG. 13 is an exemplary web browser display, illustrating the ability to view one or more web browsing sessions related to a selected user account, such as illustrated in FIG. 12.

FIG. 13 is an exemplary web browser display, illustrating the ability to view one or more web browsing sessions related to a selected user account, such as illustrated in FIG. 12. As illustrated, the user has selected user account 1262 related to John_D. Upon receiving that selection, web browser display 860 can facilitate display of account window 1360. Account window 1360 can include any number of previous sessions 1362 from which to continue browsing. Additionally, an edit option 1364 can be provided for reconfiguring (e.g., adding, removing, rearranging, etc.) web pages related to a particular session.

Figure 14:
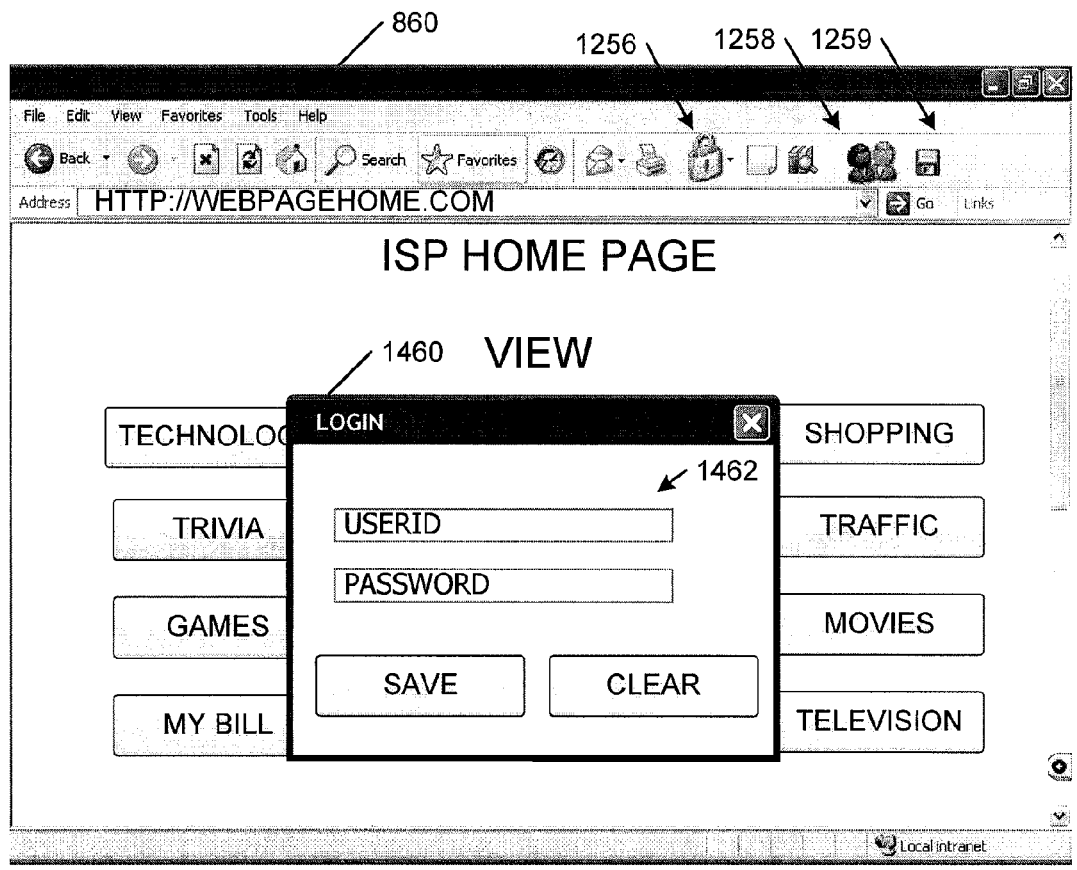
FIG. 14 is an exemplary web browser display, illustrating user authentication for accessing data related to a previous web browsing session, similar to the web browser display from FIG. 13.

FIG. 14 is an exemplary web browser display, illustrating user authentication for accessing data related to a previous web browsing session, similar to the web browser display from FIG. 13. As illustrated, upon a user selecting the authentication option 1256, the save session option 1259, and/or trying to access a user account, as described with respect to FIGS. 12 and/or 13 (e.g., via selection of user accounts option 1258), the user may be prompted with login window 1460. Login window 1460 can be configured to authenticate a user to an account related to the web browser display 860. The login window can include a USERID and password prompt 1462, however this is not a requirement. More specifically, in at least one embodiment, the user may be authenticated via biometric authentication techniques.

Figure 15:
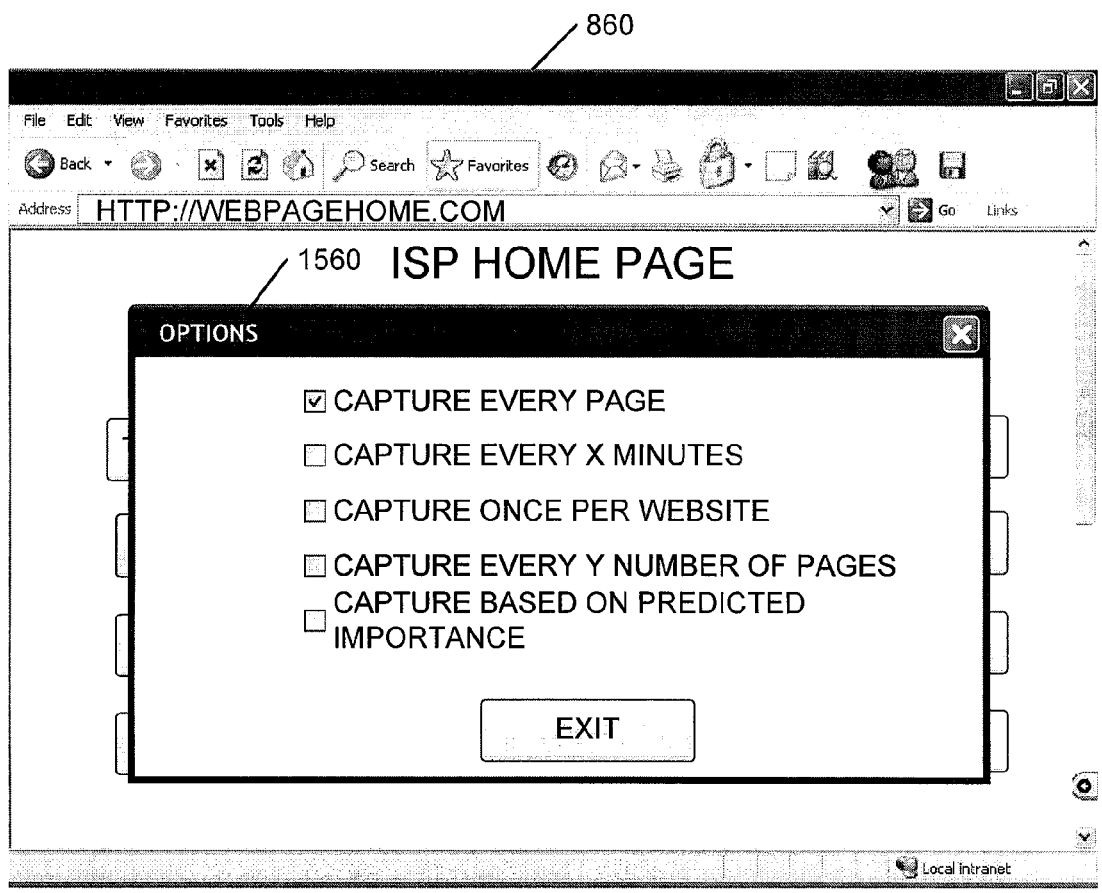
FIG. 15 is an exemplary web browser display, illustrating an options menu for determining a technique for storing a current web browsing session, similar to the web browser display from FIG. 14.

FIG. 15 is an exemplary web browser display, illustrating an options menu for determining a technique for storing a current web browsing session, similar to the web browser display from FIG. 14. By selecting an "options" option (not shown), the user can access options window 1560. Options window 1560 can include any number of different options, however, in at least one embodiment, options window 1560 includes various options for capturing a web page snapshot related to the current browsing session. More specifically, in this nonlimiting example, the user can determine whether the web browser display 860 will capture every page visited by the user. The user can also determine whether to capture a snapshot every "X" number of minutes (where "X" can represent a user-defined number of minutes, and/or a default number of minutes). The user can also determine whether to capture one web page per website, to save every "Y" number of pages, and/or to save on the predicted importance of the web page relative to other web pages in the current session. More specifically, the web browser display 860 can be configured with determination logic to document various user actions on visited web pages. Actions such as inputs, downloads, uploads, time spent, scrolling, number of times returned to the web page, etc. can be used to determine whether this page should be captured.

One should note that the options in FIG. 15 can be performed before and/or after a web page has been captured. More specifically, in at least one embodiment, the web browser can capture all visited web pages and then make a determination as to which pages can be deleted (and/or removed from display). Other embodiments can provide that such a determination is made upon the user accessing the web page.

Figure 16:
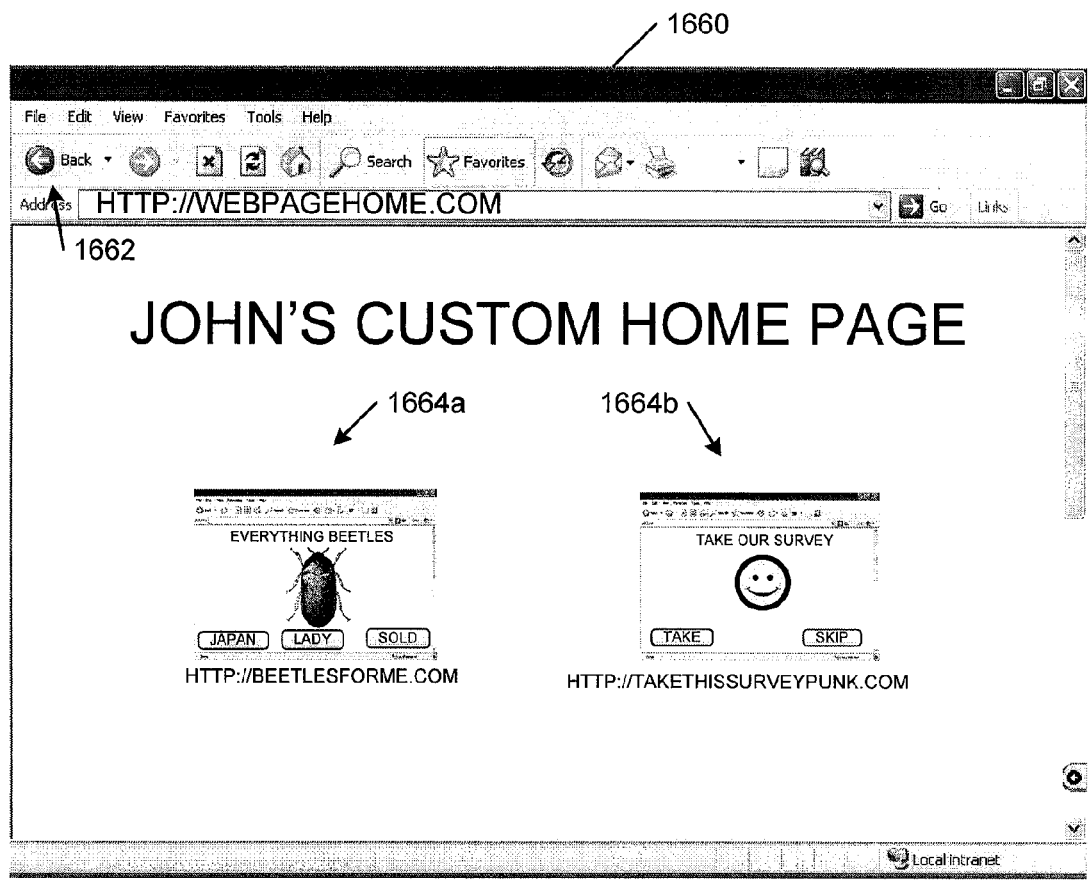
FIG. 16 is an exemplary web browser display, illustrating a thumbnail representation of a plurality of web pages from a previous search being displayed as a home page, similar to the web browser display from FIG. 8.

FIG. 16 is an exemplary web browser display, illustrating a thumbnail representation of a plurality of web pages from a previous search being displayed as a home page, similar to the web browser display from FIG. 8. In this nonlimiting example, web browser display 1660 is configured to display results of previous web browsing sessions as the home page. As illustrated, the user can select one or more of the thumbnails 1664a and 1664b to access the desired data. Additionally, the user can access these web pages via selection of the back button 1662.

One should note that while the embodiment of FIG. 16 illustrates a configuration of providing thumbnail representations of one or more previously viewed web pages, this is a nonlimiting example. More specifically, in at least one configuration, the web browser display 1660 can be configured to default to the last viewed web page upon being activated. In other words, the web browser display 1660 can be configured to set a predetermined web page from a previous search as the home page. As the user initiates and terminates web browsing sessions, the default page can change accordingly. Thus, in such a configuration, the web browser can appear the same (and/or similar) from the termination of a previous web browsing session to the initiation of the next web browsing session.

Figure 17:
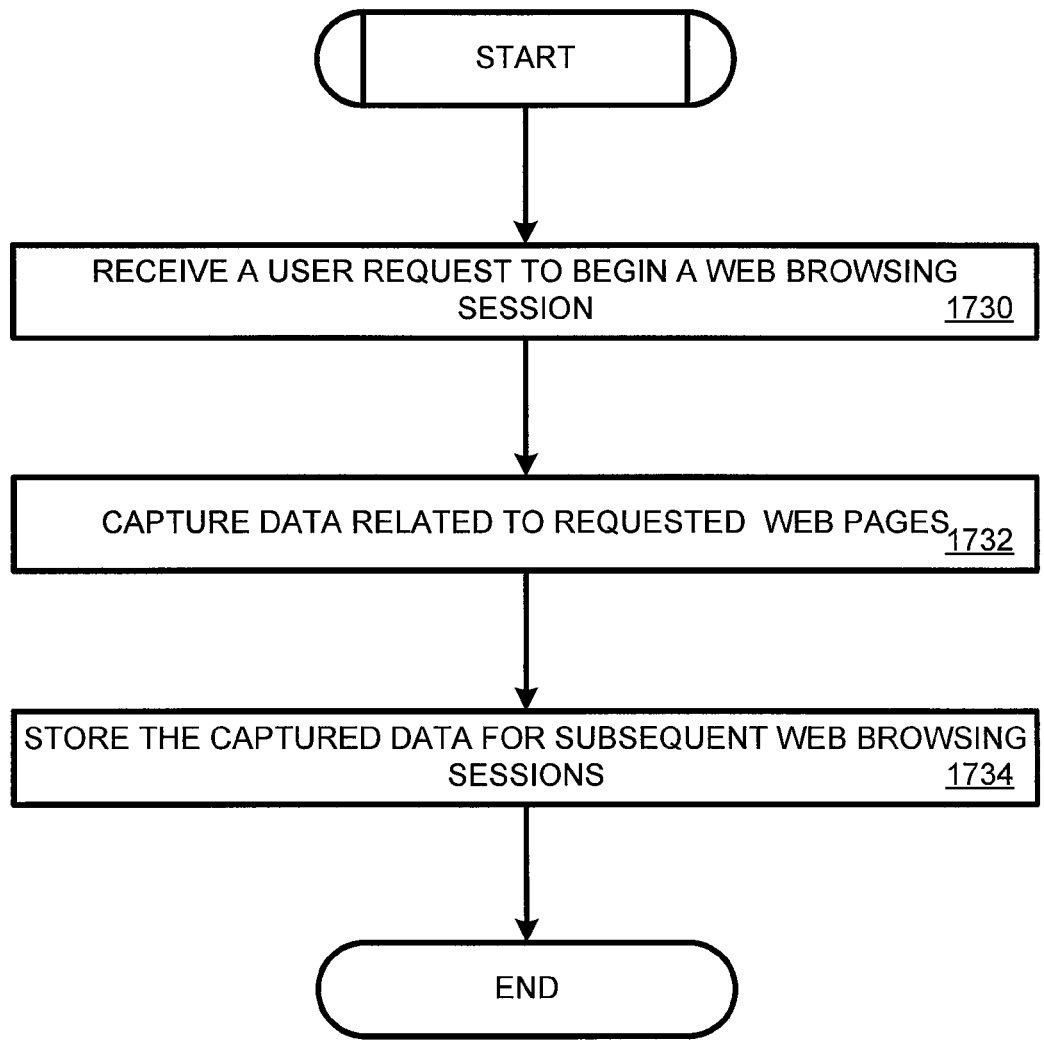
FIG. 17 is a flowchart illustrating an exemplary process that may be used to capture data related to at least one web page.

FIG. 17 is a flowchart illustrating an exemplary process that may be used to capture data related to at least one web page. As illustrated in the nonlimiting example of FIG. 17, a web browser display, such web browser display 860, can receive a user request to begin a web browsing session (block 1730). More specifically, in at least one embodiment, the user can begin a web browsing session by opening the web browser display 860. The web browser display 860 can then request a home page. The user can then begin requesting web pages via the web browser display 860. The web browser display 860 can then capture data related to requested pages (block 1732). As discussed above, the web browser display 860 can capture visual data, as well as other data related to the requested web page. The data can include information input/uploaded by the user, information downloaded by the user, time spent on the web page, time the web page was requested, etc. The web browser 860 can then facilitate storage of the captured data for subsequent web browsing sessions (block 1734).

Figure 18:
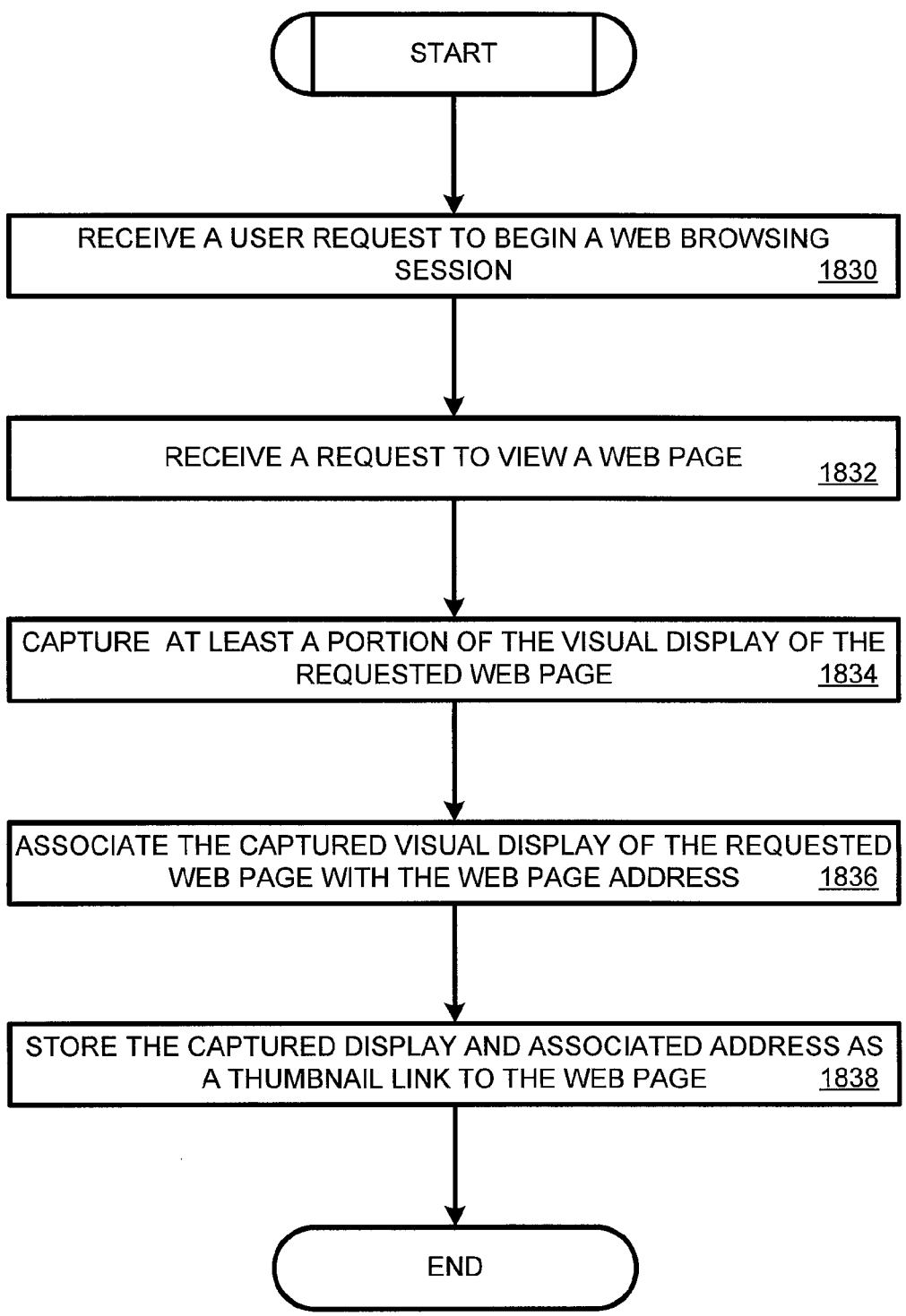
FIG. 18 is a flowchart diagram illustrating an exemplary process that may be used to capture and store a visual display of a current web browsing session, similar to the flowchart from FIG. 17.

FIG. 18 is a flowchart diagram illustrating an exemplary process that may be used to capture and store a visual display of a current web browsing session, similar to the flowchart from FIG. 17. As illustrated in the nonlimiting example of FIG. 18, a web browser display, such as web browser display 860, can receive a user request to begin a web browsing session (block 1830). The web browser display 860 can then receive a request to view a web page (block 1832). The request can come in the form of receiving a URL from the user, receiving a selection of a stored web page, and/or via other requesting techniques. The web browser display 860 can then capture at least a portion of the visual display of the requested web page (block 1834). The web browser display 860 can then associate the captured visual display of the requested web page with the web page address (block 1836). The web browser display 860 can then store the captured display and associated address as a thumbnail link to the web page (block 1838).

Figure 19:
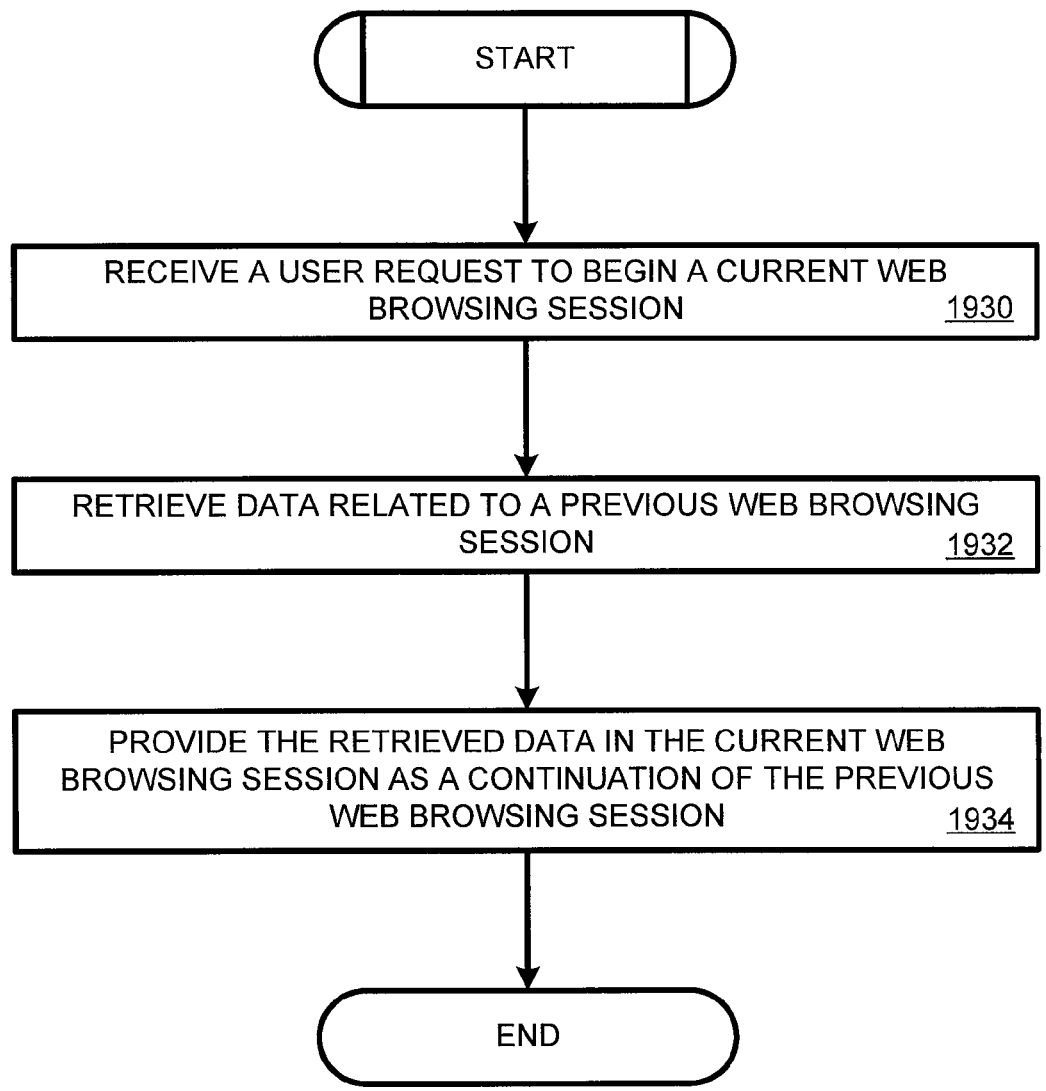
FIG. 19 is a flowchart diagram illustrating an exemplary process that may be used to retrieve data related to a previous web browsing session, similar to the flowchart from FIG. 18.

FIG. 19 is a flowchart diagram illustrating an exemplary process that may be used to retrieve data related to a previous web browsing session, similar to the flowchart from FIG. 18. As illustrated in the nonlimiting example of FIG. 19, a web browser display, such as web browser display 860 can receive a user request to begin a current web browsing session (block 1930). The web browser can then retrieve data related to a previous web browsing session (block 1932). The web browser can then provide the retrieved data in the current web browsing session as a continuation of the previous web browsing session (block 1934).

Figure 20:
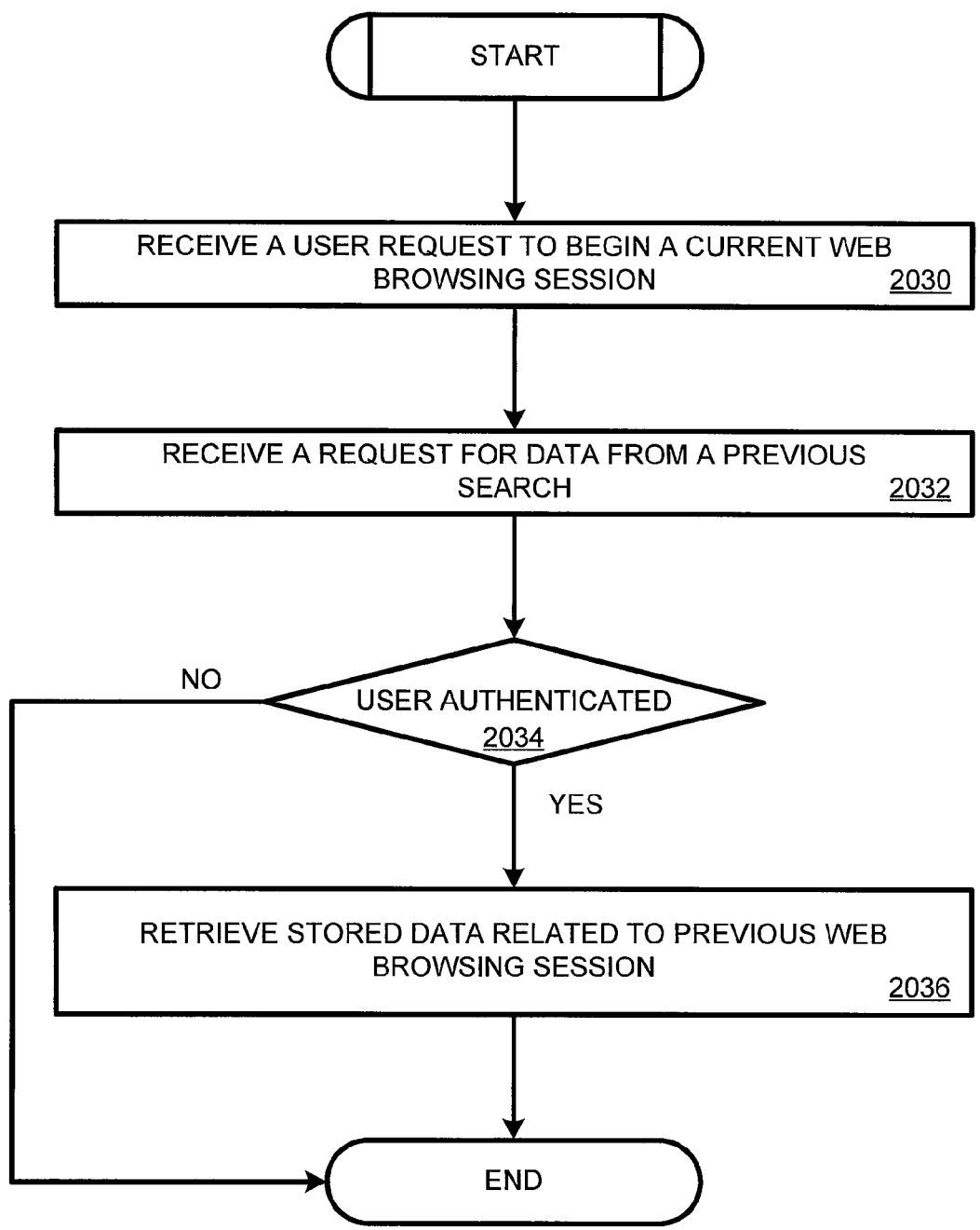
FIG. 20 is a flowchart diagram illustrating an exemplary process that may be used to retrieve data related to a previous web browsing session upon user authentication, similar to the flowchart from FIG. 19.

FIG. 20 is a flowchart diagram illustrating an exemplary process that may be used to retrieve data related to a previous web browsing session upon user authentication, similar to the flowchart from FIG. 19. As illustrated in FIG. 20, a web browser display, such as web browser display 860, can receive a user request to begin a current web browsing session (block 2030). As discussed above, this can include activation of the web browser display 860 and/or other techniques. The web browser display 860 can then receive a request for data from a previous search (block 2032). The request can result from the user selecting the back button (e.g., back button 862) and/or other technique discussed above. The web browser display 860 can then determine whether the user is authenticated to access the requested data (block 2034). If the user is not authenticated (e.g., the user refuses to submit requested information for authentication and/or the user does not provide the desired information to authenticate), the web browser display 860 can allow the user to browse web pages, but not permit the user access to previous web browsing sessions. If, on the other hand, the web browser display 860 determines that the user is authenticated, the web browser can retrieve stored data related to a previous web browsing session (block 2036) to facilitate continuation of that previous web browsing session.

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that, while the embodiments discussed above refer to configurations related to a web browser, these are nonlimiting examples. More specifically, in at least one embodiment, the description above can relate to logic configured for navigation of files on a computing system and/or network. Additionally, other applications for associating a previous navigation session with a current session can also be included in this disclosure.

Additionally, one should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

One should note that any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

Therefore, at least the following is claimed:

1. A method for resuming a previous browsing session, comprising:
   receiving, by a computing device, a request to initiate a current browsing session;
   in response to receiving a request to initiate the current browsing session, retrieving data regarding navigation of a user in the previous browsing session;
   using the retrieved data in the current browsing session such that the current browsing session is presented as a continuation of the previous browsing session, wherein the current browsing session comprises presentation of a plurality of web pages corresponding to web page addresses that were visited in the previous browsing session, wherein the data regarding navigation of the user that is retrieved further comprises a plurality of captured screenshot images of the plurality of web pages from the previous browsing session, wherein a setting as to how often a screenshot image is captured during the current browsing session is configurable by the user;
   tracking user actions for a web page visited within the current browsing session; and
   determining whether to capture and store the web page associated with the current browsing session based on the user actions being tracked.

2. The method of claim 1, further comprising determining whether the user is authenticated prior to providing the data retrieved regarding navigation of the user in the previous browsing session.

3. The method of claim 1, wherein the data retrieved regarding navigation of the user in the previous browsing session includes at least data previously input by the user.

4. The method of claim 1, further comprising presenting for display at least one web page from the plurality of web pages in response to a user selection of a back button.

5. The method of claim 1, further comprising capturing the data related to the previous browsing session.

6. The method of claim 1, further comprising capturing data related to the user actions for the web page visited within the current browsing session, wherein the data related to the user actions comprises at least one of a number of user downloads, a number of user uploads, time spent visiting the web page, and a number of times returned to the web page.

7. The method of claim 1, further comprising navigating back to one of the web pages from the previous browsing session as if the previous browsing session is part of the current browsing session.

8. A non-transitory computer readable medium that stores a program for resuming a previous browsing session, that, when executed by a computer, causes the computer to perform at least the following:
   receive a request to initiate a current browsing session;
   in response to receiving a request to initiate a current browsing session, retrieve data regarding navigation of a user in a previous browsing session, the previous browsing session including navigation by the user to at least one web page not navigated to in the current browsing session, the previous browsing session;
   provide the retrieved data in the current browsing session such that the current browsing session is presented as a continuation of the previous browsing session, wherein the current browsing session comprises presentation of a plurality of web pages corresponding to web page addresses that were visited in the previous browsing session, wherein the data regarding navigation of the user that is retrieved further comprises a plurality of captured screenshot images of the plurality of web pages from the previous browsing session, wherein a setting as to how often a screenshot image is captured during the current browsing session is configurable by the user;

track user actions for a web page visited within the current browsing session; and determine whether to capture and store the web page associated with the current browsing session based on the user actions being tracked.

9. The non-transitory computer readable medium of claim 8, the program further causing the computer to determine whether the user is authenticated prior to providing the data regarding navigation of the user in the previous browsing session.

10. The non-transitory computer readable medium of claim 8, wherein providing the data regarding navigation of the user in the previous browsing session includes providing for display a captured screenshot image of at least one web page.

11. The non-transitory computer readable medium of claim 8, wherein providing the data regarding navigation of the user in the previous browsing session includes providing data previously input by the user.

12. The non-transitory computer readable medium of claim 8, wherein providing the data regarding navigation of the user in the previous browsing session includes providing at least one web page via a user selection of a back button.

13. The non-transitory computer readable medium of claim 8, the program further causing the computer to capture data related to the previous browsing session.

14. The non-transitory computer readable medium of claim 8, the program further causing the computer to capture data related to the user actions for the web page visited within the current browsing session, wherein the data related to the user actions comprises at least one of a number of user downloads, a number of user uploads, time spent visiting the web page, and a number of times returned to the web page.

15. A computing device configured for resuming a previous browsing session, comprising:

a processor configured to execute at least one piece of logic; and a storage device configured to store a web browser, the web browser comprising:

logic configured to receive a request to initiate a current browsing session;

logic configured to, in response to receiving a request to initiate a current browsing session, retrieve data regarding navigation of a user in a previous browsing session, the previous browsing session including navigation by the user to at least one web page not navigated to in the current browsing session, the previous browsing session;

logic configured to provide the retrieved data in the current browsing session such that the current browsing session is presented as a continuation of the previous browsing session, wherein the current browsing session comprises presentation of a plurality of web pages corresponding to web page addresses that were visited in the previous browsing session, wherein the data regarding navigation of the user that is retrieved further comprises a plurality of captured screenshot images of the plurality of web pages from the previous browsing session, wherein a setting as to how often a screenshot image is captured during the current browsing session is configurable by the user;

logic configured to track user actions for a web page visited within the current browsing session; and logic to determine whether to capture and store the web page associated with the current browsing session based on the user actions being tracked.

16. The computing device of claim 15, wherein the web browser further includes logic configured to determine whether the user is authenticated prior to providing the data regarding navigation of the user in the previous browsing session.

17. The computing device of claim 15, wherein providing the data regarding navigation of the user in the previous browsing session includes providing for display a captured screenshot image of at least one web page.

18. The computing device of claim 15, wherein providing the data regarding navigation of the user in the previous browsing session includes providing data previously input by the user.

19. The computing device of claim 15, wherein the web browser further includes logic configured to capture data related to the previous browsing session.

20. The computing device of claim 15, wherein the web browser further includes logic configured to capture data related to the user actions for the web page visited within the current browsing session, wherein the data related to the user actions comprises at least one of a number of user downloads, a number of user uploads, time spent visiting the web page, and a number of times returned to the web page.

* * * * *